United States Patent [19] [11] Patent Number: 4,638,861
Kaushansky [45] Date of Patent: Jan. 27, 1987

[54] METHOD FOR TREATING THE BOTTOM-HOLE FORMATION ZONE

[75] Inventor: David A. Kaushansky, Moscow, U.S.S.R.

[73] Assignee: Moskovsky Institut Neftekhimicheskoi i Gazovoi Promyshlennosti, Moscow, U.S.S.R.

[21] Appl. No.: 740,072

[22] PCT Filed: Jul. 11, 1984

[86] PCT No.: PCT/SU84/00034
§ 371 Date: Mar. 11, 1985
§ 102(e) Date: Mar. 11, 1985

[87] PCT Pub. No.: WO85/00403
PCT Pub. Date: Jan. 31, 1985

[30] Foreign Application Priority Data

Jul. 12, 1983 [SU] U.S.S.R. ................... 3611705

[51] Int. Cl.$^4$ .................. E21B 21/00; E21B 41/02; E21B 43/27
[52] U.S. Cl. .................. 166/247; 166/307; 166/312; 166/902

[58] Field of Search .............. 166/244.1, 247, 279, 166/310, 311, 312, 307, 305 R; 250/253

[56] References Cited

U.S. PATENT DOCUMENTS 2,769,921 11/1956 Nahin et al. ................... 250/253
3,489,218 1/1970 Means ................... 166/247

FOREIGN PATENT DOCUMENTS 875925 7/1971 Canada ................... 166/244.1
875926 7/1971 Canada ................... 166/244.1
690167 10/1979 U.S.S.R. ................... 166/279
698925 11/1979 U.S.S.R. .
739218 6/1980 U.S.S.R. ................... 166/244.1
929818 5/1982 U.S.S.R. .
976039 11/1982 U.S.S.R. .
1002540 3/1983 U.S.S.R. .

*Primary Examiner*—George A. Suchfield
*Attorney, Agent, or Firm*—Fleit, Jacobson, Cohn & Price

[57] ABSTRACT

A method relates to the oil recovery and comprises feeding a bactericidal agent to the bottom-hole zone of a formation being worked, the bactericidal agent comprising gamma-radiation with a dose of at least 150 krad.

7 Claims, No Drawings

METHOD FOR TREATING THE BOTTOM-HOLE FORMATION ZONE

FIELD OF THE ART

The invention relates to the oil recovery, and more specifically, it deals with methods for treating the bottom-hole formation zone.

STATE OF THE ART

Known in the art are methods for suppressing sulfate-reducing bacteria in flooded oil-bearing beds by using chemical reagents which are fed to the bottom-hole zone with water.

The general disadvantage of the known methods resides in that it is not possible to achieve complete suppression of the activity of sulfate-reducing bacteria, hydrocarbon-oxidizing and other microorganisms since during the period when a bactericidal substance is in the bottom-hole zone microorganisms adjust themselves to bactericidal reagents so that different types of bactericidal substances should be alternately used. These methods give inadequate oil recovery rate and high content of bacterial slime and biomass.

In addition, these known methods are difficult in realization, they require expenses for low-capacity production facilities for producing bactericidal substances and for creating specific-action additives having an effect with respect to sulfate-reducing bacteria; the substances used should comply with requirements as to solubility or colloidal dispersibility in aqueous media, compatibility with mineralized water; they should have a low solidification point, low toxicity, etc. Such chemical reagents should be continuously fed to formations, they cannot reduce the content of hydrogen sulfide in the injected water, nor can they reduce the formation of iron sulfides and bacterial slime on the bottom-hole walls.

It is known to treat the bottom-hole zone of a formation being worked by feeding a bactericidal agent to the bottom-hole zone (cf. USSR Inventor's Certificate No. 976039, Cl. E 21B 43/22, 1981).

This method cannot, however, increase the oil recovery rate since the bottom-hole zone is clogged with a biomass consisting of anaerobic and aerobic microorganisms and with sulfides.

SUMMARY OF THE INVENTION

The invention is based on the problem of providing a method for treating the bottom-hole formation zone which can ensure the suppression of aerobic and anaerobic microorganisms and improve permeability of the formation by lowering sulfate reduction and formation biomass of microorganisms and bacterial slime on the bottom-hole zone walls.

This problem is solved by that in a method for treating the bottom-hole zone of a formation being worked, comprising feeding a bactericidal agent to the bottom-hole zone, according to the invention, the bactericidal agent comprises gamma-radiation with a dose of at least 150 krad, the pressure in the bottom-hole zone being maintained within the range from 2 to 50 MPa during the irradiation.

Owing to application of gamma-radiation with a dose of at least 150 krad, suppression (inactivation) of sulfate-reducing, hydrocarbon-oxidizing and other kinds of anaerobic and aerobic microorganisms is ensured which, in turn, makes it possible to reduce corrosion of the equipment, lower hydrogen sulfide content in the bottom-hole zone and oil being recovered and improve the intake rate of injection wells. Maintaining pressure within the range from 2 to 50 MPa during irradiation of the bottom-hole zone inactivates sulfate-reducing bacteria, hydrocarbon-oxidizing and other microorganisms (including ferrobacteria) which are present in the bottom-hole zone fluids thereby lowering the amount of hydrogen sulfide being formed, hence the amount of iron sulfides and bacterial slime. The reduction of the amount of bacterial slime, hydrogen sulfide and iron sulfide results in the maintenance and improvement of permeability of the formation, improvement of oil quality and reduction of corrosion of oil recovery equipment.

In order to intensify the process of suppression of anaerobic and aerobic microorganisms, the bottom-hole zone is preferably treated at regular intervals with a chemical bactericidal agent during the exposure to gamma-radiation.

The combined action of bactericidal agent, pressure and gamma-radiation can provide for lowering the radiation dose necessary to suppress sulfate-reducing bacteria so that the process of suppression of sulfate-reducing bacteria is intensified.

The bottom-hole formation zone is preferably flushed with an acid capable of washing-off and dissolving biomass of microbial cells and restoring filtering capacity of the well during irradiation of the bottom-hole zone thus contributing to an improvement of permeability and recovery rate of the formation as a whole.

The acid may comprise 12–15% solution of hydrochloric acid, hydrofluoric acid, sulfuric acid or acid compositions (such as a mixture of hydrochloric and hydrofluoric acids).

PREFERRED EMBODIMENT OF THE INVENTION

The invention will now be described with reference to a specific embodiment thereof.

A method for treating the bottom-hole formation zone according to the invention consists of the following steps. The bottom-hole zone of a formation being worked is treated with gamma-radiation with a dose of at least 150 krad, and pressure in the bottom-hole zone of the formation is maintained within the range from 2 to 50 MPa during irradiation.

To intensify the process of suppression of microorganisms, a chemical bactericidal agent is fed at regular intervals to the bottom-hole formation zone during several hours.

During irradiation of the bottom-hole formation zone, to improve permeability and recovery rate of the formation, the bottom-hole zone is flushed with an acid which is capable of dissolving the mass of killed microbial cells.

Specific examples of practical realization of the invention will be given below for better understanding of the invention.

EXAMPLE 1

A storage culture of sulfate-reducing bacteria was placed in an apparatus in which pressure in the range from 1 to 50 MPa could be provided. The number of microorganisms was within the range from $10^8$ to $10^9$ c/ml. The apparatus containing the storage culture of sulfate-reducing bacteria was subjected only to gamma-irradiation within the dose range from 75 to 1000 krad, irradiation in combination with pressure and irradiation in combination with pressure and bactericidal agent. Control tests conducted concurrently with the experimental tests involved the same concentration of microorganisms per 1 ml that were not subjected to irradiation and pressure; subjected to pressure without irradiation and bactericidal agent; subjected to a treatment with a bactericidal agent without irradiation and pressure; subjected to a treatment with a bactericidal agent and pressure without irradiation.

After the experimental and control tests, quantitative account of surviving cells was conducted using the Postgate media B and C. Development of sulfate-reducing bacteria was recorded by an increase in hydrogen sulfide as measured by the iodometric titration and by the presence of mobile cells during microscopic examinations of cultures in an optical microscope. The test results are given in the Table.

The tests showed that with the combined action of ionizing radiation and pressure of 2 MPa, the threshold radiation dose for suppression of sulfate-reducing bacteria was 300 krad, and with the pressure of 50 MPa the threshold dose was 150 krad. When gamma-radiation only was used with the abovementioned doses, and surviving sulfate-reducing bacteria were present at a rate of $10^1$–$10^4$ c/ml. When the tests were conducted with a pressure within the range from 2 to 50 MPa during 120 minutes (without radiation and bactericidal agents), surviving cells were also present. At a pressure below 2 MPa radiation doses of 300 krad and even greater were needed for the complete suppression of activity of sulfate-reducing bacteria, and the upper pressure limit (above 50 MPa) is determined by the fact that it is within this range that the combined action of the ionizing radiation and pressure factor manifests itself in the most efficient manner. Therefore, only the method conditions according to the invention can ensure the substantial suppression of sulfate-reducing bacteria in the bottom-hole formation zone.

EXAMPLE 2

The test was conducted under the conditions similar to those described in Example 1, but the storage culture was treated with potassium bichromate used in an amount of 10 mg/l. The preferred test involved the combined action of gamma-radiation with a dose of 150 krad, pressure of 2 MPa and a bactericidal substance (such as potassium bichromate). In this case the inactivation of microorganisms was intensified thus contirubitng to the reduction of the time needed for treating the bottom-hole zone and lowering concentration of bactericidal agents used. This method is most effective for strongly contaminated oil deposits during the initial period of use of the method according to the invention for a more efficient action upon the bottom-hole zone. A single or intermittent treatment with a bactericidal agent can be used (see the Table). In the tests that involved only a bactericidal agent, with the same concentration of the bactericidal agent, sulfate-reducing bacteria cells were not suppressed.

EXAMPLE 3

A model of a formation in the form of a horizontally extending tube filled with a fraction of sandstone was used. Pressure gauges were installed at both ends of the tube. Taps were provided at the inlet and outlet of the formation model. Fluid was pumped through by means of a pump ensuring a uniform fluid supply. The fluid flow rate was measured with a measuring vessel. Water that did not contain cells of microoganisms and water containing $10^8$–$10^9$ c/ml of microorganisms was caused to pass through the tube. Water permeability of the sandstone sample was 280 mD for clean water and 210 mD for water containing cells (after four hours of pumping). Subsequently 10% hydrochloric acid was fed during one hour to react with the sandstone. After the acid treatment, water that did not contain cells of microorganisms was pumped, and water permeability was measured which was 265 mD with the use of gamma-radiation with a dose of 300 krad. Since cells of microorganisms were inactivated during the radiation treatment with gamma-radiation, the formation of biomass (bacterial slime) was stopped, and no further clogging of the formation model rock occurred. Therefore, water permeability was maintained. In case where the radiation-killed cells of microorganisms were washed-off by the acid treatment, water permeability was further improved and retained for a long-term period (the restoration factor in this case was 1.25).

The use of the method according to the invention provides the following advantages over the prior art: corrosion of the oil-recovery equipment is reduced and its service life prolonged; sulfate-reducing bacteria and other microorganisms in the bottom-hole formation zone are suppressed in a more efficient manner; permeability and recovery rate of injection wells are improved; formation of hydrogen sulfide in oil-bearing beds of oil deposits being worked is substantially reduced; formation of bacterial slime on the walls of the bottom-hole zone is reduced if not completely eliminated in certain applications, and processes of sulfate-destruction are suppressed; quality of oil being recovered is improved; environment protection is ensured.

INDUSTRIAL APPLICABILITY OF THE INVENTION

The method according to the invention can be preferably used in treating the bottom-hole zones of all or of the majority of injection wells at oil fields. Only in such case can maximum results be achieved. The bottom-hole zones of development wells can be subjected to the radiation treatment by the method according to the invention.

TABLE

Relationship of Radiation Resistance (Survival) of Sulfate-Reducing Bacteria (Storage Culture) v. Gamma-Radiation Dose, Pressure and Bactericidal Treatment

| Treatment type | Absorbed dose, krad | Pressure, MPa | Exposure time, min | Bactericidal agent concentration, mg/l | Survival of sulfate-reducing bacteria (absence or presence of live cells) |
|---|---|---|---|---|---|
| 1 | 2 | 3 | 4 | 5 | 6 |
| Pressure | — | 2 | 120 | — | presence |
|  | — | 20 | 120 | — | presence |

TABLE-continued

Relationship of Radiation Resistance (Survival) of Sulfate-Reducing Bacteria (Storage Culture) v. Gamma-Radiation Dose, Pressure and Bactericidal Treatment

| Treatment type<br>1 | Absorbed dose, krad<br>2 | Pressure, MPa<br>3 | Exposure time, min<br>4 | Bactericidal agent concentration, mg/l<br>5 | Survival of sulfate-reducing bacteria (absence or presence of live cells)<br>6 |
|---|---|---|---|---|---|
| | — | 40 | 120 | — | presence |
| | — | 50 | 120 | — | presence |
| Bactericidal agent (potassium bichromate) | — | — | 20 | 10.0 | presence of cells |
| Bactericidal agent (potassium bichromate) | — | 2 | — | 10.0 | presence of cells |
| Pressure | | 20 | — | — | presence of cells |
| | | 40 | — | — | presence of cells |
| Gamma-radiation | 75 | — | — | — | presence of cells |
| | 150 | — | — | — | presence of cells |
| | 300 | — | — | — | presence of cells |
| | 500 | — | — | — | presence of cells |
| | 800 | — | — | — | absence of cells |
| | 1000 | — | — | — | absence of cells |
| Gamma-radiation + pressure | 75 | 2 | — | — | presence of cells |
| | 150 | 2 | — | — | presence of cells |
| | 300 | 2 | — | — | absence of cells |
| | 500 | 2 | — | — | absence of cells |
| | 800 | 2 | — | — | absence of cells |
| | 75 | 20 | — | — | presence of cells |
| | 150 | 20 | — | — | presence of cells |
| | 300 | 20 | — | — | absence of cells |
| | 500 | 20 | — | — | absence of cells |
| | 800 | 20 | — | — | absence of cells |
| | 75 | 40 | — | — | presence of cells |
| | 150 | 40 | — | — | absence of cells |
| | 300 | 40 | — | — | absence of cells |
| | 500 | 40 | — | — | absence of cells |
| | 800 | 40 | — | — | absence of cells |
| | 40 | 50 | — | — | presence of cells |
| | 75 | 50 | — | — | presence of cells |
| | 150 | 50 | — | — | absence of cells |
| | 300 | 40 | — | — | absence of cells |
| | 500 | 50 | — | — | absence of cells |
| | 800 | 50 | — | — | absence of cells |
| Gamma-radiation + pressure + bactericidal preparation (potassium bichromate) | 30 | 2 | — | 10 | presence of cells |
| | 75 | 2 | — | 10 | presence of cells |
| | 150 | 2 | — | 10 | absence of cells |
| | 300 | 2 | — | 10 | absence of cells |
| | 500 | 2 | — | 10 | absence of cells |
| | 800 | 2 | — | 10 | absence of cells |
| | 30 | 50 | — | 10 | presence of cells |
| | 75 | 50 | — | 10 | absence of cells |
| | 150 | 50 | — | 10 | absence of cells |
| | 300 | 50 | — | 10 | absence of cells |
| | 500 | 50 | — | 10 | absence of cells |
| | 800 | 50 | — | 10 | absence of cells |

I claim:

1. A method for treating a bottom-hole formation zone comprising the steps of
irradiating the zone with a bactericidal agent comprising gamma rays at a dose of at least 300 krad, and
maintaining the pressure within said zone between 2 and 50 MPa during said irradiating step.

2. The method according to claim 1 further comprising the step of treating said zone with a chemical bactericidal agent at regular intervals during said irradiating step.

3. The method according to claim 1 further comprising the step of flushing said zone with an acid capable of washing off and dissolving a biomass of microbial cells during said irradiating step.

4. A method for treating a bottom-hole formation zone comprising the steps of
irradiating the zone with a bactericidal agent comprising gamma rays at a dose of at least 150 krad, and
maintaining the pressure within said zone between 40 and 50 MPa during said irradiating step.

5. The method according to claim 4 further comprising the step of flushing said zone with an acid capable of washing-off and dissolving a biomass of microbial cells during said irradiating step.

6. A method for treating a bottom-hole formation zone comprising the steps of
irradiating the zone with a bactericidal agent comprising gamma rays at a dose of at least 150 krad,
maintaining the pressure within said zone between 2 and 50 MPa during said irradiating step, and
treating said zone with a chemical bactericidal agent at regular intervals during said irradiating step.

7. The method according to claim 6 further comprising the step of flushing said zone with an acid capable of washing-off and dissolving a biomass of microbial cells during said irradiating step.

* * * * *